(No Model.)
W. L. CHURCH.
ICE MAKING APPARATUS.
No. 529,346. Patented Nov. 13, 1894.
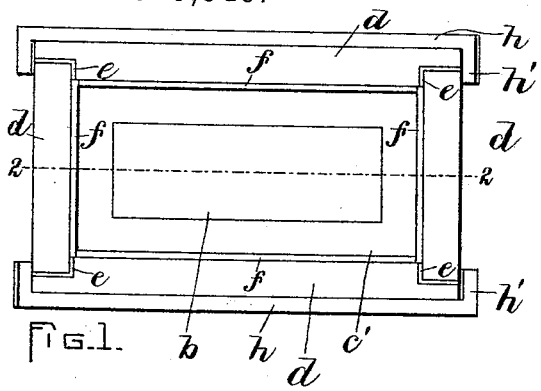
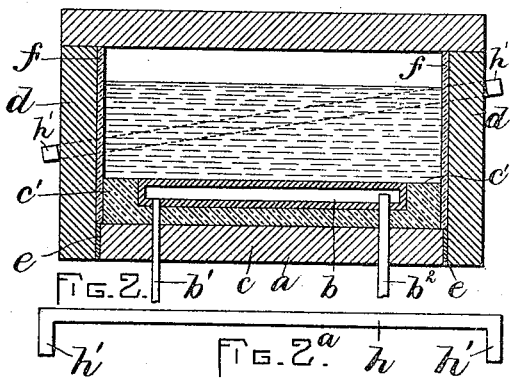
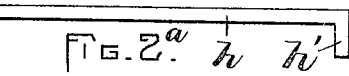
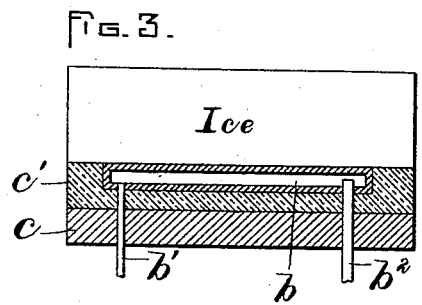
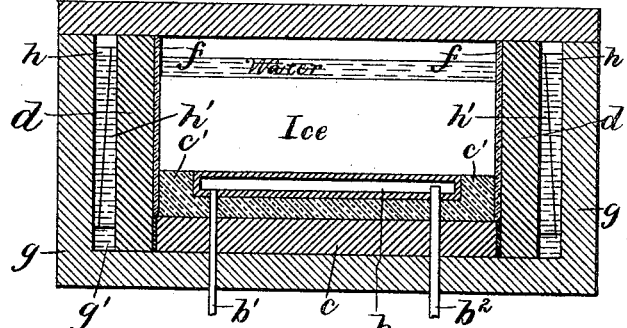
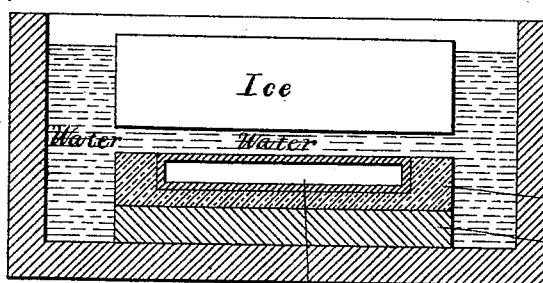
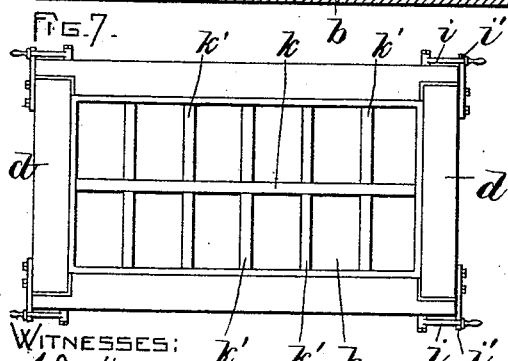
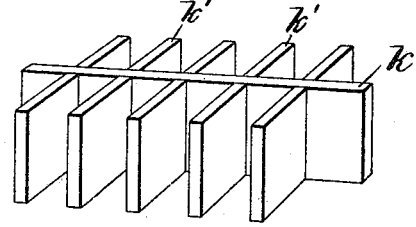
WITNESSES:
A. D. Harrison
W. F. McLeod
INVENTOR:
Wm Lee Church
by Wright Brown Quimby
Attys.
THE NORRIS PETERS CO., PHOTO-LITHO., WASHINGTON, D. C.

UNITED STATES PATENT OFFICE.

WILLIAM LEE CHURCH, OF NEWTON, MASSACHUSETTS, ASSIGNOR TO THE WESTINGHOUSE, CHURCH, KERR & COMPANY, OF JERSEY CITY, NEW JERSEY, AND NEW YORK, N. Y.

ICE-MAKING APPARATUS.

SPECIFICATION forming part of Letters Patent No. 529,346, dated November 13, 1894.

Application filed January 30, 1894. Serial No. 498,429. (No model.)

*To all whom it may concern:*

Be it known that I, WILLIAM LEE CHURCH, of Newton, in the county of Middlesex and State of Massachusetts, have invented certain new and useful Improvements in Ice-Making Apparatus, of which the following is a specification.

This invention relates to tanks or receptacles in which sweet water is held and frozen into cakes of ice by the action of a refrigerating agent on the walls of a freezing bed or plate contained in the tank and forming the bottom surface of the water space, or a part of said surface.

The invention has for its object to provide a tank of this class adapted to give the sides of a cake of ice any form that may be desired, and particularly to produce a cake the sides of which shall be substantially at right angles with the bottom, and from which the cake can be readily removed without the necessity of a thawing operation to separate it from the sides of the tank.

The invention consists mainly in an ice shaping tank comprising a bottom section or base having a freezing bed or plate and side sections detachably connected to said base, the whole constituting a sectional mold or receptacle the sides of which are adapted to shape the sides of the cake of ice and to be removed from said cake after the completion of the latter, thus permitting the unobstructed removal of the cake from the bed on which it was formed.

The invention also consists in certain incidental improvements, all of which I will now proceed to describe and claim.

Of the accompanying drawings, forming a part of this specification, Figure 1 represents a top view of an ice shaping tank embodying my invention. Fig. 2 represents a section on line 2—2 in Fig. 1. Fig. 2ª represents a view of one of the appliances shown in Fig. 2, for binding together the sections of the tank. Fig. 3 represents a section showing the base, freezing bed, and cake of ice, as shown in Fig. 2, the side sections and top of the tank being removed. Fig. 4 represents a vertical section showing the sectional tank contained in an outer tank of water-tight construction. Fig. 5 represents a section similar to Fig. 4, showing the side sections of the sectional tank removed and the ice floating in the outer tank. Fig. 6 represents a detail view showing another device for securing the sections together. Fig. 7 represents a top view showing a tank provided with removable internal partitions for the purpose of forming a series of small cakes of ice for family use. Fig. 8 represents a perspective view of the partitions arranged as shown in Fig. 7, with the sides removed.

The same letters of reference indicate the same parts in all the figures.

In carrying out my invention I provide a tank composed of a bottom section or base $a$ to which is affixed a freezing bed or plate $b$, and the side sections $d$ constituting the walls of the tank, said sections being separable from each other and from the base $a$, and constructed so that when assembled they cooperate with the base in forming a substantially water-tight tank which can be taken apart or knocked down to expose the sides of the cake of ice formed therein.

The bed $b$ is adapted to receive a volatile liquid such as liquid ammonia through a pipe $b'$, and to discharge gas expanded from said liquid, through a pipe $b^2$. The outer surface of the bed $b$ constitutes the bottom of the water space of the tank, or a considerable portion of said bottom, the bed being here shown as insulated from the base $a$ by a filling $c$ of non-conducting material such as paraffine, said material being extended upwardly along the sides of the bed and forming an ice limiting border $c'$ flush with the bed and presenting a surface to which the ice will not adhere.

The joints between the various sections are provided with packings $e$, preferably of a compressible material such as rubber, adapted when the sections are assembled to make the joints water-tight. The said sections are internally surfaced with a material of low conductivity to which ice will not adhere, such as paraffine, and said material may be applied either by being absorbed or incorporated into the pores of the wood of which said sections are made or by being attached in the form of lining sheets or strips $f$, which may be of paraffine, or other waterproof non-conductive and non-adhesive material or a composition of paraffine and some fibrous material, or of any other suitable material, the object being to enable the side sections to readily separate or cleave from the sides of the cake of ice.

The means for detachably connecting the sections and holding them in the form of a tank may be variously modified. In Figs. 2 and 2ª I show as such means two locking bars $h$, each having ears $h'$ at its ends, said bars being applied to the tank in the manner shown in Figs. 1 and 2, its ears bearing on the end sections while the body of the bar extends along the side sections; and the bars $h$ are applied by pressing one of its ears in an upward direction against one of the sections, and the other ear in an upward direction against another section, as indicated in Figs. 1 and 2, the bars being held in place by friction. In Fig. 6 I show one of the sections provided with a swinging hasp or locking lever $i$, and the other with a catch or fixture $i'$, adapted to co-operate with said lever, said parts $i$ and $i'$ constituting members of a fastening device such as in constant use for securing refrigerator doors.

In the operation of the device, the sections are assembled and clamped together to make the joints practically water-tight, and the water is introduced. The bed is then cooled by the introduction and expansion of the volatile liquid, and a cake of ice is formed upon the bottom of the tank and in contact with the bottom and side sections of the tank, the cake therefore being shaped on its bottom and sides by the tank. After the completion of the cake, the side sections are disconnected and removed, their non-adhesive inner surfaces enabling them to readily cleave from the ice, leaving the latter upon the bed as shown in Fig. 3, so that the cake is unobstructed, and may be readily removed from the bed when cleaved from the latter, which may be accomplished by warming the bed in any suitable way. Moreover, the sides being non-conducting, the top surface of the cake is always a plane, and the completed cake is therefore, strictly rectangular on all faces.

It will be seen that by this improved apparatus I am enabled to produce a rectangular cake of ice the sides of which are at right angles with the bottom and top, a cake of this form being preferable to one formed with inclined sides as is usual in the production of artificial ice in a forming mold, because the cakes can be more compactly stored and are considered more desirable by the public.

In Figs. 4 and 5 I show an outer tank $g$, which is of solid water-tight construction and is of sufficient size to receive the sectional tank above described. The tank $g$ is preferably separated from the sectional tank by a surrounding water space $g'$, said space receiving water up to about the level of the water in the inner sectional tank.

The operation of this form of apparatus is as follows:—The sections of the inner tank are assembled in the outer tank, and both tanks are charged with water. The freezing operation is then performed, after which the side sections of the inner tank are removed, as shown in Fig. 4. The freezing operation may be arrested before the ice reaches the surface of the water in the tank, so that after the removal of the side sections of the inner tank the remaining water may be utilized to float or lift the cake from the bed, as shown in Fig. 5. The employment of the outer tank renders the water tight construction of the sectional tank comparatively unimportant. Hence the packing devices above described will not be essential. The parts of the sectional tank may be held together by means of wedges $h$ $h'$ inserted in the space $g'$, as shown in Fig. 4.

In Fig. 7 I show a sectional tank, the interior of which is subdivided by partitions $k$ $k'$, arranged to form a number of comparatively small cubical blocks of ice in the tank. Said partitions are preferably separable from each other and from the tank, although if desired the partition may be affixed to the base of the tank. Said partitions are composed of a non-adhesive material or are surfaced with such material, so that they will readily cleave from the cakes of ice formed in contact with them.

I do not limit myself to a sectional tank in which all the side pieces or walls are separable from each other and from the base. If desired, one or more of the side pieces may be separable and the others rigidly affixed to the base, this arrangement enabling the cake to be released by the removal of one of the side pieces, and then moved away from the fixed side pieces, the non-adhesive surfaces of the latter permitting the ice to cleave from them readily.

I claim—

1. An ice-shaping tank comprising a bottom section or base, a freezing bed or plate attached thereto, and adapted to contain an artificial refrigerating agent, and rigid or self-supporting side sections provided with non-conducting, waterproof inner surfaces which are non-adhesive to ice and shape the vertical sides of the cake without adhering thereto, so that the side sections may readily cleave from a cake of ice, one or more of said side sections being separable from the base.

2. An ice-shaping tank comprising a bottom section or base, a freezing bed or plate and adapted to contain an artificial refrigerating agent attached thereto, and rigid or self-supporting side sections detachably connected to said base, the said sections being provided with packings which maintain substantially water-tight joints when the sections are assembled, said sections being made of a non-conducting, waterproof material which is non-adhesive to ice, and cleaves readily from the ice when the sections are disconnected.

3. A sectional ice-shaping tank comprising a bottom section or base, a freezing bed or plate attached thereto, and adapted to contain an artificial refrigerating agent, one or more rigid or self-supporting side sections separable from said base and made of non-conducting, waterproof material which is non-adhesive to ice, compressible packings at the joints of said sections, and means for detachably connecting said sections and compressing said packings.

4. A sectional ice-shaping tank comprising a bottom section or base having a freezing bed or plate adapted to contain an artificial refrigerating agent, and an ice-limiting border which is non-adhesive to ice surrounding said bed, and rigid or self-supporting side sections detachably secured to said base and made of non-conducting, waterproof material which is also non-adhesive to ice, said side sections joining the said border around the bed.

5. A sectional ice-shaping tank composed of a bottom section having a freezing bed adapted to contain an artificial refrigerating agent, and rigid or self-supporting side sections made of non-conducting, waterproof material which is non-adhesive to ice, said sections being separable, combined with a water-tight inclosing tank surrounding said sectional tank.

6. A sectional ice-shaping tank comprising a bottom section having a freezing bed adapted to contain an artificial refrigerating agent, rigid or self-supporting side sections separable from the base and made of non-conducting, waterproof material which is non-adhesive to ice, and removable partitions which are also made of non-conducting and waterproof material which is non-adhesive to ice, and are formed to sub-divide the tank.

7. An ice-shaping tank combined with a rigid or self-supporting removable partition made of non-conducting, waterproof material which is non-adhesive to ice and is formed to subdivide the tank.

In testimony whereof I have signed my name to this specification, in the presence of two subscribing witnesses, this 20th day of January, A. D. 1894.

WM. LEE CHURCH.

Witnesses:
C. F. BROWN,
ARTHUR W. CROSSLEY.